(12) United States Patent
Grasser

(10) Patent No.: US 12,551,923 B2
(45) Date of Patent: Feb. 17, 2026

(54) METHOD FOR AIDING THE MASKING OF WORKPIECE SURFACES TO BE PAINTED OR TREATED

(71) Applicant: SAFRAN LANDING SYSTEMS, Velizy Villacoublay (FR)

(72) Inventor: Mickael Grasser, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 490 days.

(21) Appl. No.: 17/296,321

(22) PCT Filed: Nov. 26, 2019

(86) PCT No.: PCT/EP2019/082638
§ 371 (c)(1),
(2) Date: May 24, 2021

(87) PCT Pub. No.: WO2020/109337
PCT Pub. Date: Jun. 4, 2020

(65) Prior Publication Data
US 2022/0040728 A1 Feb. 10, 2022

(30) Foreign Application Priority Data
Nov. 27, 2018 (FR) ...................................... 1871951

(51) Int. Cl.
*B05D 1/32* (2006.01)
*G06T 7/70* (2017.01)
(Continued)

(52) U.S. Cl.
CPC .................. *B05D 1/32* (2013.01); *G06T 7/70* (2017.01); *G06T 19/006* (2013.01); *G06V 20/647* (2022.01)

(58) Field of Classification Search
CPC ...... B05D 1/32; G06V 20/647; G06T 19/006; G06T 7/70
See application file for complete search history.

(56) References Cited

U.S. PATENT DOCUMENTS

2008/0315092 A1* 12/2008 Kley ....................... G03F 7/704
250/307
2016/0320863 A1* 11/2016 Shimoda ............... G06F 3/0304

OTHER PUBLICATIONS

Mauricio A. Frigo et al., "Augmented Reality in Aerospace Manufacturing: A Review", Journal of Industrial and Intelligent Information, Mar. 2016, 6 pgs., vol. 4, No. 2.
(Continued)

*Primary Examiner* — Joseph A Miller, Jr.
(74) *Attorney, Agent, or Firm* — Sughrue Mion, PLLC

(57) ABSTRACT

The invention provides a method of assisting masking a part (100), the method comprising, prior to working on the part, the steps of:
using a numerical model (1) of the part to define at least one virtual surface (2) for masking by extracting from the model a geometrical surface of the part that is to be masked, and by duplicating said geometrical surface; and
assigning instructions (3) about masking to the virtual surface for masking as defined in this way; then
when an operator is working on a part matching the numerical model, taking at least one image of the part and enabling the operator to view the image of the part with the virtual surface for masking superposed thereon while also displaying the associated instructions; and
after the part matching the numerical model has been masked, taking an image of the masked part and comparing on the image the real masked surface with the virtual surface for masking.

5 Claims, 2 Drawing Sheets

(51) Int. Cl.
*G06T 19/00* (2011.01)
*G06V 20/64* (2022.01)

(56) References Cited

OTHER PUBLICATIONS

M. Park, "Design and Evaluation of an Augmented Reality Welding Helmet", Human Factors and Ergonomics in Manufacturing, 2007, pp. 317-330, vol. 17, No. 4.
Satish Kumar, "5 Ways Augmented Reality Revolutionize The Manufacturing I Arp" Nov. 4, 2018, https://www.augrealitypedia.com/augmented-reality-manufacturing/.
Margaret Penney, "Paint the World with Augmented Reality Apps", Sep. 28, 2017, 10 pgs., https://www.sessions.edu/notes-on-design/paint-the-world-with-augmented-reality-apps/.
International Search Report for PCT/EP2019/082638 dated Jan. 2, 2020 (PCT/ISA/210).

* cited by examiner

METHOD FOR AIDING THE MASKING OF WORKPIECE SURFACES TO BE PAINTED OR TREATED

The invention relates to a method of assisting the masking of parts to be painted or treated.

CROSS REFERENCE TO RELATED APPLICATIONS

This application is a National Stage of International Application No. PCT/EP2019/082638 filed Nov. 26, 2019, claiming priority based on French Patent Application No. 18 71951 filed on Nov. 27, 2018, the entire contents of each of which being herein incorporated by reference in their entireties.

BACKGROUND OF THE INVENTION

Certain portions of numerous parts, and in particular of aircraft landing gear parts, need to receive layers of primer and/or paint for protecting certain areas that are subjected to open air and weather. The areas for painting are generally specified by a design office directly on a drawing of the part. The design office then determines the various steps necessary for painting the part, in particular prior masking steps and the extents of the areas to be masked.

Masking is also used for the purpose of treating certain portions of the surface of a part, e.g. by immersion in an electrolytic bath.

Masking information is often conveyed to operators in paper form, or in PDF format.

OBJECT OF THE INVENTION

An object of the invention is to provide assistance in masking parts for painting or treating, making it possible to improve the accuracy of the masking.

SUMMARY OF THE INVENTION

In order to achieve this object, there is provided a method of masking a part, the method comprising the steps of:
  using a numerical model of the part to define at least one virtual surface for masking by extracting from the model a geometrical surface of the part that is to be masked, and by duplicating said geometrical surface; and
  assigning instructions about masking to the virtual surface for masking as defined in this way; then
  when an operator is working on a part matching the numerical model, taking at least one image of the part and enabling the operator to view the image of the part with the virtual surface for masking superposed thereon while also displaying the associated instructions; and
  after the part matching the numerical model has been masked, taking an image of the masked part and comparing on the image the real masked surface with the virtual surface for masking.

Thus, the operator sees very clearly on the image of the part the area for masking and takes note of the associated instructions, without any need to consult a document.

Proper performance of the masking is inspected by taking at least one image of the masked part and by comparing the real masked surface with the virtual surface for masking on the image. This comparison makes it possible to know whether the masked surface does indeed match the virtual surface for masking. Thus if there exist any areas for masking that have not been masked, or on the contrary if there exist any areas of the part where the real masked surface goes beyond the virtual surface for masking, it is possible to identify these areas in the image of the part.

Preferably, the method implements both a shape recognition algorithm that recognizes the part on the image that has been taken and also an augmented reality algorithm that superposes the previously-defined virtual surface for masking on the image of the part.

The image may be taken with any suitable type of sensor.

In a preferred implementation of the invention, the operator's workstation is provided with a camera suitable for taking images of the part placed on the workstation, with the image of the part then being displayed on an inspection screen arranged in the proximity of the workstation.

The method of the invention facilitates masking operations, since, while performing the masking operations, the operator no longer needs to consult information on paper, or in the so-called "pdf" format.

BRIEF DESCRIPTION OF THE DRAWINGS

The invention can be better understood in the light of the following description of a particular embodiment of the invention, given with reference to the figures of the accompanying drawings, in which.

DETAILED DESCRIPTION OF THE INVENTION

Figure 1:
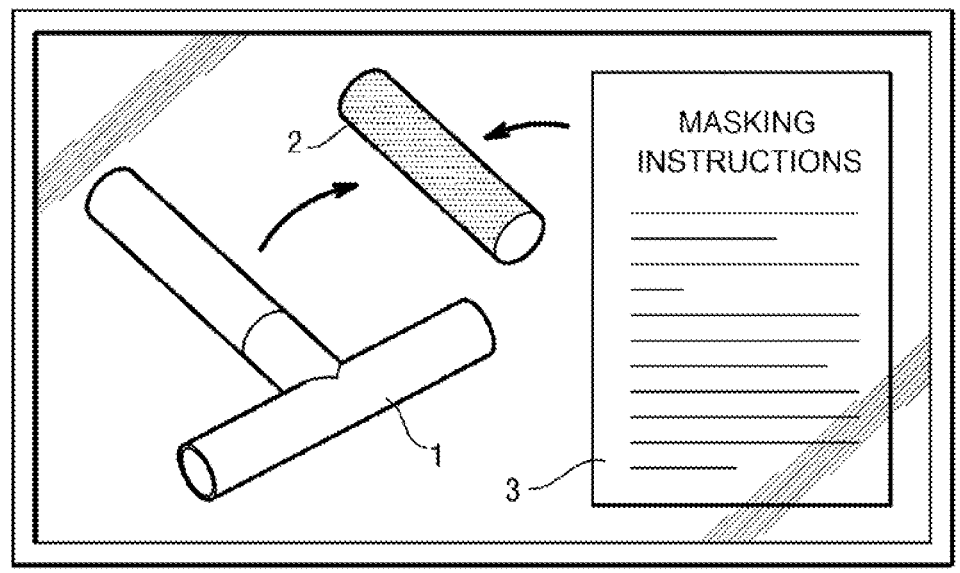
FIG. 1 is a view of a screen displaying the numerical model of a part for masking in a perspective view, and showing the definition of a virtual surface for masking.

With reference to FIG. 1, the method of the invention begins with a step of using a numerical model 1 of a part to define a virtual surface 2 for masking that corresponds to an area of the part that is to be masked during a subsequent operation of painting or treating the part. To do this, it is appropriate to extract from the numerical model the surface(s) defining the part in the area for masking, and to duplicate it in order to make an independent numerical model referred to herein as the virtual surface 2 for masking. If a plurality of areas of the part need to be masked during a single surface treatment or painting operation, it is convenient to group together the virtual surfaces for masking in a single group. On a landing-gear part, mention may be made, by way of example, of the group of masks needed for a single operation of applying a primer, a finishing paint, or an anti-gravel coating. Thereafter, the method of the invention includes a step of associating instructions 3 both for making the masks modelled by the virtual surfaces for masking and also for inspecting them.

For example, if the model of the part is made using the computer assisted design (CAD) software published under the CATIA trademark by the supplier DASSAULT SYSTEMES, then the CATIA software is used to extract and duplicate the surfaces that define the numerical model of the part in the area that is to be masked, and the CATIA COMPOSER tool is used to group together the virtual surfaces for masking as defined in this way. Then by using the tool under the DIOTACONNECT trademark from the supplier DIOTA SOFTWARE, which is accessible in CATIA COMPOSER, the instructions for making and/or inspecting masks are associated with each virtual surface for masking, or with each group, where applicable.

Figure 2:
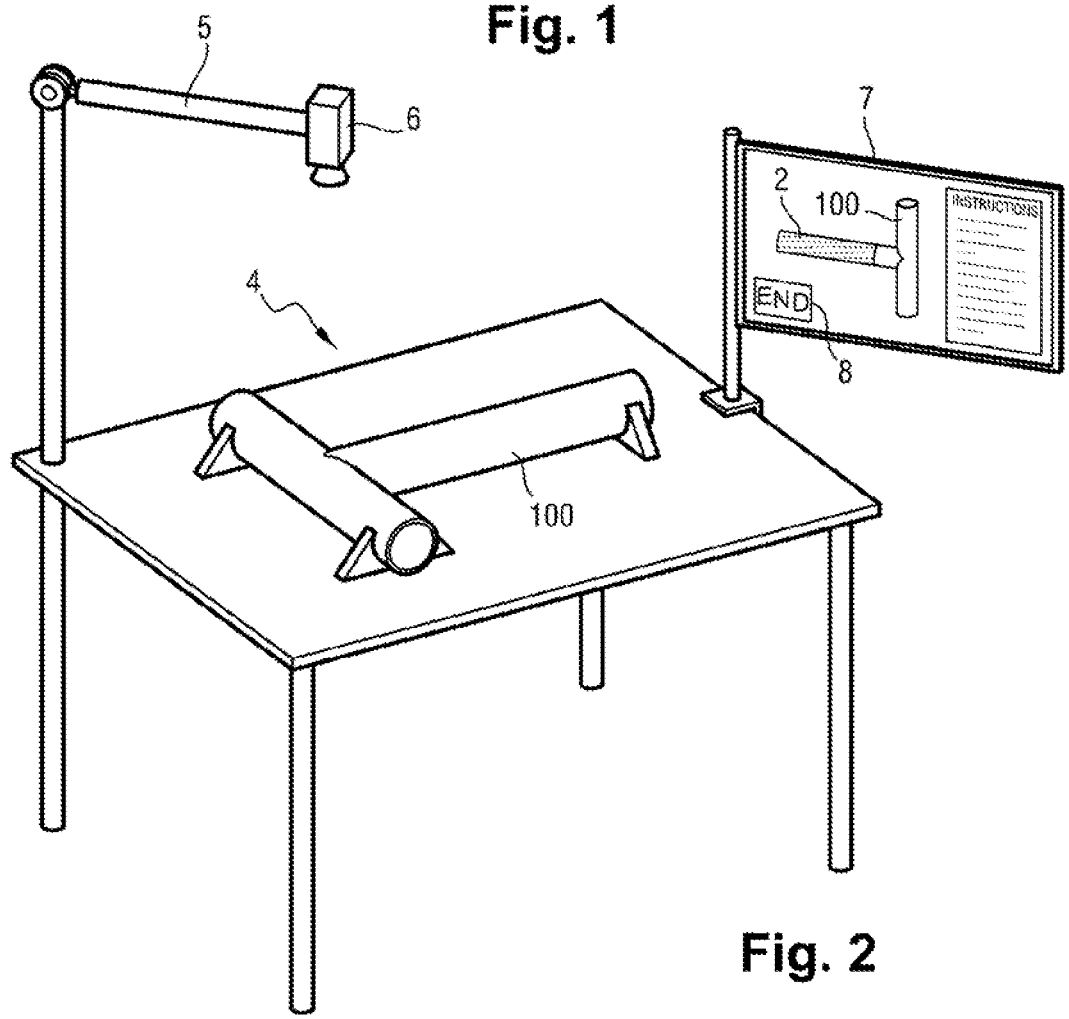
FIG. 2 is a view of a masking workstation on which a part has been placed, the workstation being provided with a camera and with an inspection screen.

FIG. 2 shows a workstation including a reception space 4 for receiving the part 100 and a gantry 5 carrying a camera 6 suitable for taking images of the part 1. The workstation is also provided with an inspection screen 7, specifically a touchscreen. When the part 100 is placed on the workstation, the camera 4 takes images of the part. Masking software that is activated during the masking operations implements a shape recognition algorithm in order to recognize, in the images taken by the camera 6, the edges of the part 100 so as to identify the part and determine its orientation in three-dimensional space. Thereafter, the software displays the image of the part 100 on the inspection screen 7 with the virtual surface 2 for masking superposed thereon so that the operator can see immediately on the screen that are the areas of the part that are to be masked. Preferably, the virtual surface 2 for masking is displayed in a contrasting color so that it stands out clearly on the part. The instructions 3 for performing the masking are then displayed on the screen 7 together with the virtual surface 2 for masking.

By following the instructions, the operator can then proceed with masking the part on that area of the part 100 that is specified in the image of the part by displaying the virtual surface for masking in superposition. Once masking has been completed, the operator indicates that the current masking operation has finished, e.g. by acting on an END button 8 on the touchscreen, and where necessary the software displays other virtual surfaces for masking, together with the corresponding instructions.

Figure 3:
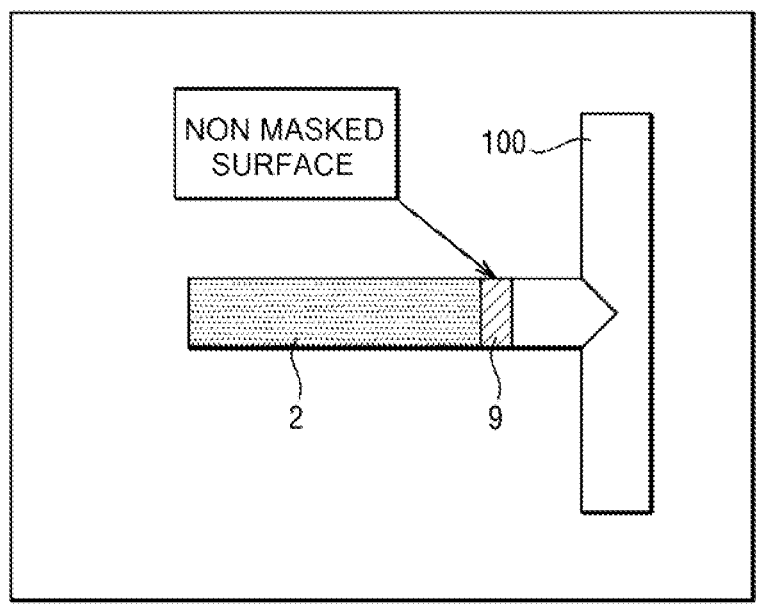
FIG. 3 is a view of an inspection image taken by the camera after masking has been performed.

In a particular aspect of the invention, and as shown in FIG. 3, the method of the invention includes a step of verifying that the masking carried out by the operator matches the virtual surface 2 for masking. To do this, the masking software analyzes at least one image of the masked part after the operator has indicated that the masking operations have finished, it compares a real masked surface in the image with the virtual surface for masking, and it determines whether the masking that has been carried out matches the virtual surface 2 for masking, or whether it does not cover enough of the part, or whether on the contrary it covers too much of the part. Specifically in this example, the software has detected an area 9 that the operator has omitted to mask. This area is highlighted in order to tell the operator what corrective action needs to be taken.

The invention is not limited to the above description, but on the contrary covers any variant coming within the ambit defined by the claims.

In particular, although above the image of the part is displayed on an inspection screen of the workstation, the image could be projected in a helmet or in augmented-reality goggles worn by the operator.

Although above the image of the part is viewed on an inspection screen 7 arranged on the workstation, the image could be made visible by any other means, such as using a video projector, for example.

Although above the image is taken by a camera fitted to a workstation where the masking is performed, the image could be taken in any other way. For example, the operator could use a tablet to take a photograph of the part on which the operator is working, with the image of the part then being viewed on the screen of the tablet with the virtual surface for masking superposed thereon.

The invention claimed is:

1. A method of assisting masking a real part, the method comprising:
   generating at least one virtual surface for masking by extracting, from a computer-aided design numerical model of the real part, a geometrical surface of the real part that is to be masked, by duplicating said geometrical surface and by saving the at least one virtual surface for masking in a computer file;
   generating instruction data for making and inspecting the masking of the real part, and saving the instruction data in the computer file;
   displaying, on a display device connected to a computer running a masking software that has access to the computer file, at least one first image of the real part with the at least one virtual surface for masking superposed thereon and with the instruction data associated with said at least one virtual surface for masking;
   masking a surface of the real part according to the instruction data;
   comparing by the masking software at least one second image of the real part including the masked surface with the at least one virtual surface for masking and determining at least one area of the real part that has been omitted to be masked or has been masked by mistake;
   displaying, on the display device, the at least one second image and highlighting said at least one area of said at least one second image; and
   taking corrective action for the masked surface according to the at least one highlighted area by masking at least one surface area of the real part which does not belong to the masked surface which is not masked and is highlighted on the second image, and/or by unmasking at least one other surface area of the real part which is masked belongs to the masked surface and is highlighted on the second image,
   wherein a surface treatment or painting operation is performed after the corrective action has been taken for the masked surface.

2. The method according to claim 1, wherein the masking software performs both a shape recognition algorithm that recognizes the real part on the at least one first image and also an augmented reality algorithm that superposes the virtual surface for masking on said at least one first image.

3. The method according to claim 2, wherein the real part is placed on a workstation provided both with a camera suitable for taking images of the real part and also with an inspection screen for displaying the at least one first image of the real part with the at least one virtual surface for masking superposed thereon and with the instruction data associated to said at least one virtual surface for masking.

4. The method according to claim 1, wherein the real part is placed on a workstation provided both with a camera suitable for taking images of the real part and also with an inspection screen for displaying the at least one first image of the real part with the at least one virtual surface for masking superposed thereon and with the instruction data associated to said at least one virtual surface for masking.

5. The method according to claim 1, further comprising imaging the masked surface of the real part using a camera to generate the at least one second image.

* * * * *